US006006604A

United States Patent
Rabelo et al.

[11] Patent Number: 6,006,604
[45] Date of Patent: Dec. 28, 1999

[54] PROBE PLACEMENT USING GENETIC ALGORITHM ANALYSIS

[75] Inventors: Luis Carlos Rabelo, Copley, Ohio; Mark George Walker, Castleton, Vt.; Radoslaw Romuald Zakrzewski, South Burlington, Vt.; Robert Curtis North, Ferrisburg, Vt.

[73] Assignee: Simmonds Precision Products, Inc., Akron, Ohio

[21] Appl. No.: 08/997,444

[22] Filed: Dec. 23, 1997

[51] Int. Cl.$^6$ .................................................. G01F 23/00
[52] U.S. Cl. .................. 73/290 R; 73/290 V; 73/304 R; 73/304 C
[58] Field of Search ............................. 73/290 R, 304 R, 73/304 C, 290 V, 1.73, 40.5 A; 96/245; 134/44, 386, 558; 367/908, 902, 98

[56] References Cited

U.S. PATENT DOCUMENTS

| | | |
|---|---|---|
| 4,208,906 | 6/1980 | Roberts, Jr. . |
| 4,262,531 | 4/1981 | Hewitt et al. ......................... 73/304 C |
| 4,868,797 | 9/1989 | Soltz ......................................... 367/98 |
| 4,976,377 | 12/1990 | Higuchi et al. . |
| 4,987,888 | 1/1991 | Funabashi et al. . |
| 5,094,213 | 3/1992 | Dudek et al. . |
| 5,124,933 | 6/1992 | Maier ..................................... 73/290 R |
| 5,184,510 | 2/1993 | Rossman ............................... 73/290 V |
| 5,273,019 | 12/1993 | Matthews et al. . |
| 5,293,553 | 3/1994 | Dudek et al. . |
| 5,474,261 | 12/1995 | Stolarczyk et al. . |
| 5,524,599 | 6/1996 | Kong et al. . |
| 5,535,135 | 7/1996 | Bush et al. . |
| 5,625,150 | 4/1997 | Greene et al. ....................... 73/40.5 A |
| 5,665,895 | 9/1997 | Hart et al. ................................ 73/1.73 |
| 5,777,948 | 7/1998 | Ferkinhoff et al. ...................... 367/131 |
| 5,790,422 | 8/1998 | Power et al. .......................... 73/304 C |
| 5,850,289 | 12/1998 | Fowler et al. ........................... 350/376 |

*Primary Examiner*—Harshad Patel
*Assistant Examiner*—Robin Clark
*Attorney, Agent, or Firm*—William E. Zitelli; Leonard L. Lewis

[57] ABSTRACT

A method for determining an optimized solution of positions for N liquid surface sensors used to gauge quantity of liquid in the container, comprising the steps of:

a) defining geometric limits of the container in terms of coordinates of a three axis (x,y,z) reference coordinate system assigned to the container;

b) defining a chromosome structure for an individual, wherein said chromosome structure identifies a solution in terms of position data of the N sensors;

c) determining a population of individuals wherein each individual in said population is a possible solution within said geometric limits; each individual having a respective chromosome; and d) executing a genetic algorithm on said population to identify a solution that meets a performance criteria as measured by a predetermined cost function.

35 Claims, 13 Drawing Sheets

| INDIVIDUAL | CHROMOSOME |
|---|---|
| 1 | X Y Z X Y Z X Y Z X Y Z X Y Z X Y Z ⌐300<br>1 1 1 1 1 1 2 2 2 2 2 2 3 3 3 3 3 3<br>b b b t t t b b b t t t b b b t t t |
| 2 | X Y Z X Y Z X Y Z X Y Z X Y Z X Y Z ⌐300<br>1 1 1 1 1 1 2 2 2 2 2 2 3 3 3 3 3 3<br>b b b t t t b b b t t t b b b t t t |
| 3 | X Y Z X Y Z X Y Z X Y Z X Y Z X Y Z ⌐300<br>1 1 1 1 1 1 2 2 2 2 2 2 3 3 3 3 3 3<br>b b b t t t b b b t t t b b b t t t |
| ⋮ | ⋮      ⟵320 |
| 189 | X Y Z X Y Z X Y Z X Y Z X Y Z X Y Z ⌐300<br>1 1 1 1 1 1 2 2 2 2 2 2 3 3 3 3 3 3<br>b b b t t t b b b t t t b b b t t t |
| 190 | X Y Z X Y Z X Y Z X Y Z X Y Z X Y Z ⌐300<br>1 1 1 1 1 1 2 2 2 2 2 2 3 3 3 3 3 3<br>b b b t t t b b b t t t b b b t t t |
| ⋮ | ⋮ |
| 598 | X Y Z X Y Z X Y Z X Y Z X Y Z X Y Z ⌐300<br>1 1 1 1 1 1 2 2 2 2 2 2 3 3 3 3 3 3<br>b b b t t t b b b t t t b b b t t t |
| 599 | X Y Z X Y Z X Y Z X Y Z X Y Z X Y Z ⌐300<br>1 1 1 1 1 1 2 2 2 2 2 2 3 3 3 3 3 3<br>b b b t t t b b b t t t b b b t t t |
| 600 | X Y Z X Y Z X Y Z X Y Z X Y Z X Y Z ⌐300<br>1 1 1 1 1 1 2 2 2 2 2 2 3 3 3 3 3 3<br>b b b t t t b b b t t t b b b t t t |

*Fig. 7*

PROBE PLACEMENT USING GENETIC ALGORITHM ANALYSIS

RELATED APPLICATIONS

This patent application is related to the following copending U.S. patent applications: Ser. No. 08/996,747 (docket no. 1970016), entitled IMPROVED ULTRASONIC LIQUID GAUGING SYSTEM; Ser. No. 08/996,858, entitled LIQUID GAUGING USING SENSOR FUSION AND DATA FUSION; Ser. No. 08/997,137 entitled BLACKBOARD CENTRIC LAYERED SOFTWARE ARCHITECTURE FOR AN EMBEDDED AIRBORNE FUEL GAUGING SUBSYSTEM; and Ser. No. 08/997,271, entitled UNIVERSAL SENSOR INTERFACE SYSTEM AND METHOD; all of which applications were filed on even date herewith and are owned in common by the assignee of the present invention, the entire disclosures all of which are fully incorporated herein by reference.

TECHNICAL FIELD

The invention relates generally to liquid gauging systems such as can be used, for example, for aircraft fuel gauging. More particularly, the invention relates to techniques for determining sensor positions in a liquid tank for a gauging system, in which the sensor positions satisfy a performance criteria by use of a genetic algorithm process.

BACKGROUND OF THE INVENTION

Liquid gauging is the determination or measurement of a quantity of liquid in a container. The quantity of liquid in a container can be defined or expressed in different units of measure, such as volume, weight, mass and height of the liquid surface in the container. As an example, in aircraft applications, aircraft fuel is contained in a plurality of fuel tanks on the aircraft. Typically, it is the mass of fuel in a tank that determines in large measure the flight distance for the aircraft. Although a measure of the fuel volume and weight may also be useful, ultimately it is an accurate determination of the mass of fuel in the tanks that is of primary interest.

The performance of any liquid gauging system is significantly dependent on the number and locations of the various liquid sensors or probes. The sensors can include any number of devices that detect a characteristic of the liquid related to volume, such as the height of the liquid surface. Height sensors include ultrasonic sensors and pressure sensors. Although these sensors do not measure surface height directly, they can be used to measure a parameter that is directly related to surface height. For example, an ultrasonic sensor can be used to measure the time delay between transmitting an acoustic energy pulse towards the liquid surface and detecting an acoustic echo reflected from the surface back toward the acoustic transmitter. Some gauging systems, especially fuel gauging systems, use elongated probes that are mounted within the liquid and detect liquid height as a function of the percentage of the probe that is immersed in the liquid.

In most liquid gauging systems, system performance and accuracy depends on the use of a sufficient number of probes, both for redundancy to increase reliability, and sufficient coverage to assure that at least one probe or sensor is capable of detecting the liquid surface. This is particularly so in dynamic systems such as aircraft in which the fuel tank can be subjected to a wide range of pitch/roll attitudes.

The number of probes/sensors and the often complex structure and geometry of the tank make the process of finding the optimal sensor/probe locations a formidable and time consuming task. Since there is rarely a linear relationship between surface height and volume (due, for example, to complex tank geometry, internal structures and attitude variations), one known approach is to use probe profiling to account for varying tank geometry at different fuel heights. Look-up tables are commonly used to compensate the probe reading at different attitudes. Regardless of the technique used to improve gauging accuracy, location of the sensors or probes will always be important. Currently, this involves a significant reliance on the skill and experience of the design engineer, and many times the final placement of the sensors and probes is as much a function of intuition and experience as it is on empirical data. This follows from the observation that in order to try out every possible combination of sensor/probe locations within a complex tank structure would involve an extraordinary amount of design time and testing. This problem is exacerbated as the number of probes and tank geometry complexity increases. The entire process must also be started anew when design changes are made to the tank structure or the type and number of probes/sensors are changed.

The objectives exist, therefore, for a wholly different approach to optimizing the location of liquid gauging sensors and probes with respect to the liquid container that will reduce the design labor and time requirements, and is flexible to re-compute the optimal locations when design changes are implemented, such as changes in the container geometry or the number and type of sensors and probes.

SUMMARY OF THE INVENTION

The present invention contemplates, in one embodiment, a liquid gauging system for a container, comprising a set of sensors associated with the container and that produce outputs related to height of fluid in the container, and a control system for determining volume of liquid in the container based on the sensor outputs. The control system executes a height to volume function to determine volume of liquid in the container based on the sensor outputs, with the sensors being disposed at positions relative to the container; which positions satisfy a predetermined performance criteria as measured by a cost function.

The present invention also contemplates the methods embodied in the use of such apparatus, as well as in another embodiment, a method for determining an optimized solution of positions for N liquid surface sensors used to gauge quantity of liquid in the container, comprising the steps of:

a) defining geometric limits of the container in terms of coordinates of a three axis (x,y,z) reference coordinate system assigned to the container;

b) defining a chromosome structure for an individual, wherein said chromosome structure identifies a solution in terms of position data of the N sensors;

c) determining a population of individuals wherein each individual in said population is a possible solution within said geometric limits; each individual having a respective chromosome; and d) executing a genetic algorithm on said population to identify an optimized solution as measured by a predetermined cost function.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 7 is a representation of an initial population of individuals that represent possible solutions;

DETAILED DESCRIPTION OF THE INVENTION

Figure 1:
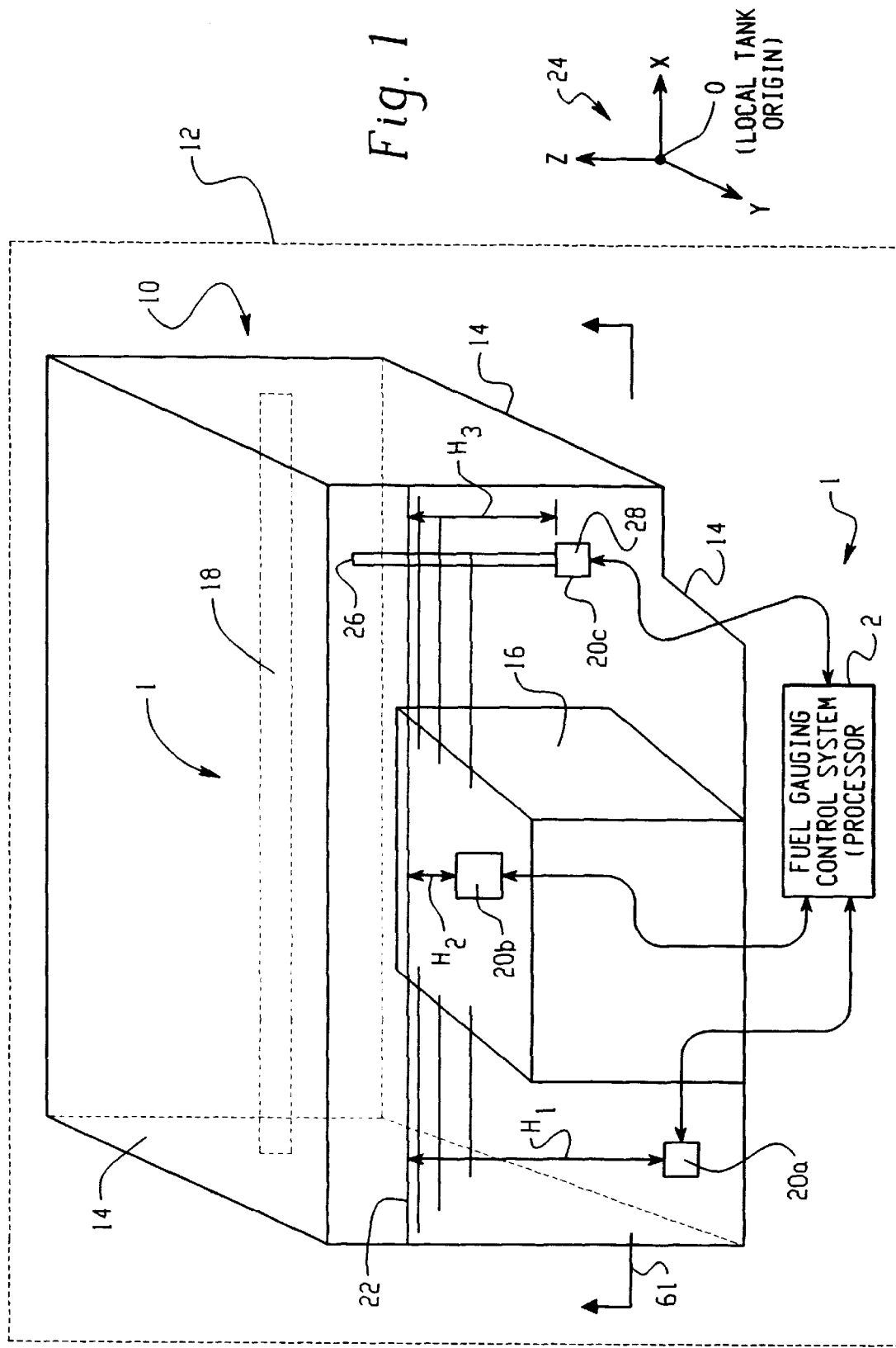
FIG. 1 is a simplified schematic of a liquid gauging system such as an aircraft fuel gauging system used to gauge volume of fuel in a tank.

With reference to FIG. 1, an embodiment of the invention is illustrated in an exemplary application, in this case for fuel gauging on an aircraft. Although the invention is described herein specifically in the context of aircraft fuel gauging, this is for purposes of illustration and explanation and should not be construed in a limiting sense. Those skilled in the art will appreciate that the present invention will have application to any liquid gauging application in which it is desired to determine the quantity of liquid in a container by the use of probes and/or sensors that detect a characteristic related to height of the liquid surface in the container.

The descriptions of the invention and various embodiments thereof in terms of the use of "sensors" and "probes" should be construed broadly. The present invention is not limited to any particular type or number of sensors and probes, and hereinafter the term "sensor" will be used to refer generically to any sensor or probe that can be used to detect a characteristic related to height of the liquid surface in the container. Such sensors may be disposed within the liquid, as for example a conventional capacitance fuel probe in an aircraft fuel tank. However, as described in the above referenced related patent applications it is preferred, but not required, that the sensors be non-intrusive, meaning that the sensors operate without exposing the liquid to electrical energy. In a preferred embodiment of a fuel gauging system, the sensors are ultrasonic level sensors and pressure sensors. A fuel gauging system can use sensors all of the same type, or can use a mix of sensors, such as is described in the above referenced co-pending applications.

With reference to FIG. 1, a very simplified illustration of a liquid container 10 in the form of an aircraft fuel tank is provided merely for purposes of illustrating various aspects of the problem of sensor placement. The tank 10 is disposed or mounted in a part of the air frame, such as a wing 12. The tank 10 may include a complex geometry, represented in a general way by the different angled surfaces of the tank 10 walls 14, as well as the presence of internal structures including for example bays 16 and piping 18. The actual structure of a typical fuel tank in an aircraft would be much more complex. A fuel gauging system 1 will include a number of sensors 20, including bottom mounted ultrasonic sensor 20a, an ultrasonic sensor 20b that is mounted at a different height in the tank relative to the sensors 20a and 20c, and an elongated capacitance sensor 20c. The liquid gauging system 1 will also include a control system 2 having a processor for controlling the sensors 20 and computing liquid volume based on the sensor 20 output signals. Further details of an exemplary embodiment of a fuel gauging system 1 is provided in the above referenced disclosures. The particular gauging system 1 design is not critical to the present invention, but rather it is the performance criteria, such as volume accuracy over a range of attitude variations, of the gauging system 1 that will determine the optimum/acceptable solution. It is the selection of the number and positions of the various sensors 20 using a search and optimization tool to locate the sensors in the tank for a gauging system that the present invention is directed to.

It is apparent from FIG. 1 that the attitude of the tank 10 in terms of pitch and roll of the tank 1 will greatly affect the ability of each sensor 20 to detect the fuel surface 22, as will the volume of the fuel in the tank 10 when a measurement is made, because the volume, along with the tank 10 attitude, will determine the height of the fuel surface 22 above each sensor 20, as indicated by the heights $H_1$, $H_2$ and $H_3$ in FIG. 1. Complex tank geometry can result in some sensors 20 being uncovered at various tank attitudes or fully covered at various attitudes. The term "attitude" as used herein refers to pitch and roll attitude, individually and in combination.

For purposes of describing the various embodiments, the following conventions are adopted. A local tank 10 coordinate system 24 is assumed, and in this example, the +z-axis corresponds to vertical up, the +x-axis is forward and is also the roll axis, and the y-axis is the pitch axis. The local origin "O" can be positioned anywhere in the tank 10, but for convenience will be assumed herein to lie at the lowest point in the tank 10 when the tank is at zero pitch and roll. These conventions are arbitrarily selected for convenience and ease of explanation and are not required in order to practice the invention. The local coordinate system x,y,z simply provides a frame of reference in order to translate the tank 10 geometry and locations of the sensors 20 into terms of geometric coordinates. Note that the location or position of an ultrasonic sensor, such as the sensor 20a or 20b, can be defined by a single set of coordinates $(x,y,z)_{20a}$. The internal elongated fuel probe 20c will require either two sets of coordinates to define the location of the probe top 26 and bottom 28, or in the case of a probe that is parallel to the z-axis, either the bottom or top coordinate and the z length dimension, or an angle value relative to the Z-axis In accordance with one aspect of the invention, optimization of sensor placement is carried out by executing a genetic algorithm as the search engine. Once the acceptable or optimal positions have been determined, the sensors can be located at those positions in a fuel gauging system to provide optimal performance in relation to the overall system design. The genetic algorithm searches through a domain of available sensor locations for a selectable number of sensors to find an acceptable combination of sensor locations that achieves the desired accuracy over all attitudes of interest for volume values between and including empty and full scale. Any combination of sensor locations that satisfies a specified system performance criteria is considered for purposes of this invention to be an acceptable or optimum solution. Therefore, reference herein to an "optimum" solution should be generally understood to mean the search for any solution that satisfies the system performance criteria.

There may be more than one acceptable solution, and the invention can be used to find the "best of the best" solutions if such is the desired output. But, more generally, any solution is an optimum solution that results in a performance that meets the system performance criteria. Thus an optimum solution can also be referred to as any acceptable or desired solution (expressed in terms of the collective locations of a set of sensors) that meets the performance criteria.

In the exemplary embodiment, since liquid gauging is the system 1 function of interest, the optimum or desired solution will be that solution that allows the system 1 to gauge the liquid quantity such as volume within a specified accuracy, say for example, within 0.2% full scale across a specified range of attitudes and volumes. Any solution of sensor positions that is found to provide such performance is an optimum solution and the genetic algorithm can be stopped at that point, or additional or better solutions can be searched for if desired. Such additional searching simply involves additional computer time.

However, gauging system accuracy need not be the only measure of what is an optimum solution. Other system performance criteria could additionally or alternatively be used to select the optimum solution. For example, the gauging system 12 may be permitted to have a number of sensors 20. The invention can be used to find results for the optimum solution of sensor locations using different numbers and/or combinations of types of sensors. The various results can then be compared to see if adding or removing sensors improves performance and at what cost. Thus, cost can be factored in as one of the criteria for whether a solution is an optimum solution. The number of sensors can also affect the overall reliability of the system 1. Therefore, reliability can be used as an additional or alternative cost factor for selecting an optimum solution. The salient point in accordance with this aspect of the invention is that although the various embodiments described herein are based on gauging accuracy as the performance criteria, such descriptions are intended to be exemplary in nature. The genetic search engine process of the present invention as described herein can accommodate different measures of performance in order to find an acceptable solution.

The genetic algorithm process provides a search engine for testing various possible solutions in order to find an optimum solution. Because the number of available sensor locations can be quite large, the number of combinations of sensor locations (S1 S2 . . . Si for i number of sensors) may be a very large number. In lieu of physical placement of the sensors at each of the various positions and testing the gauging system for accuracy, in accordance with another aspect of the invention the genetic algorithm utilizes a computer based model of the tank 10, along with a computer simulation of the gauging system 12 performance. The genetic algorithm then searches for the optimum combination of sensor locations that produces a system performance that meets the specified criteria.

Figure 2:
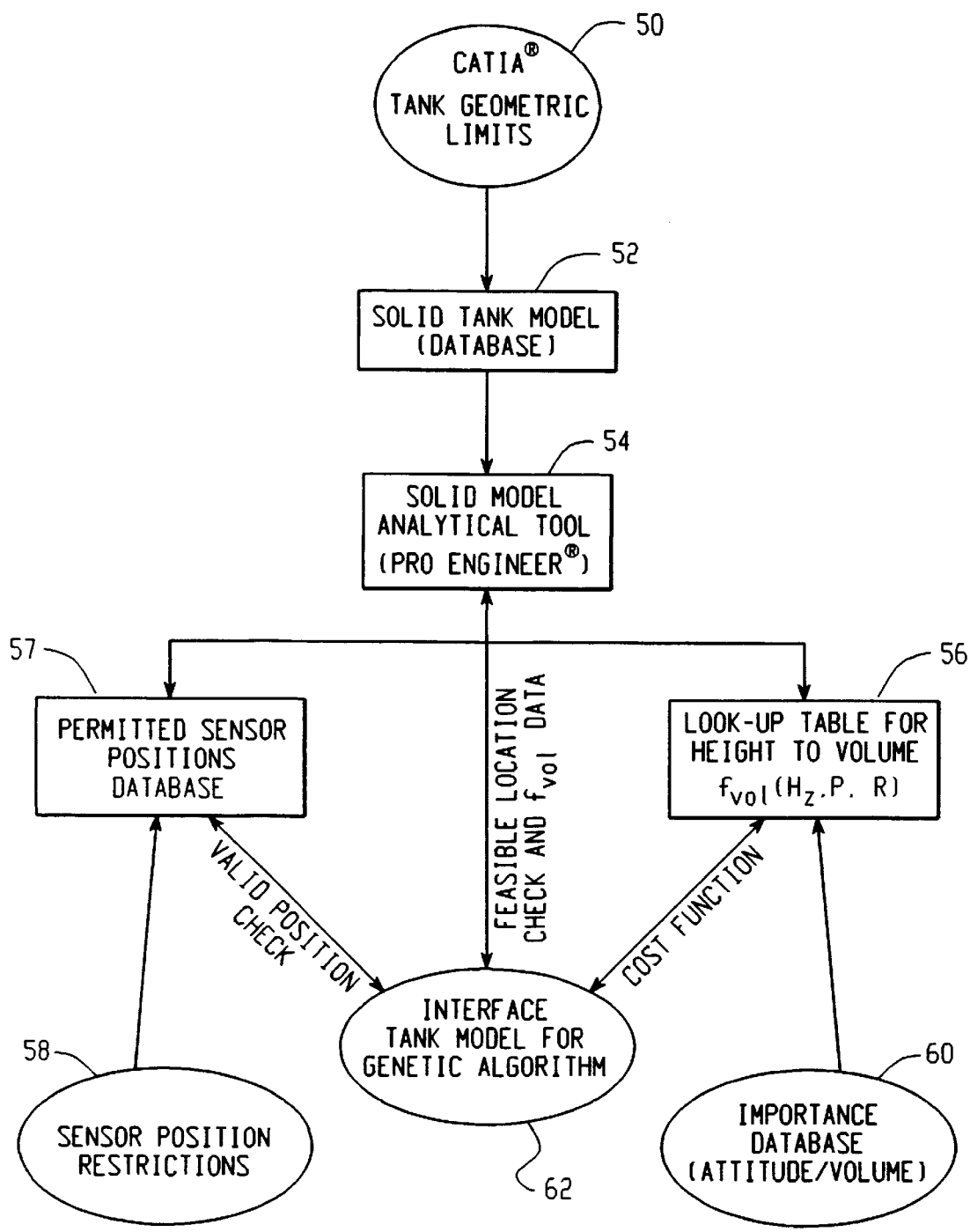
FIG. 2 is a process flow chart for the development of a solid tank model database for use with the present invention.

Thus, in accordance with the invention, a computer model of the liquid container, in this case a fuel tank 10 is generated. FIG. 2 illustrates the basic steps involved in defining the tank 10. A computer program 50 such as for example CATIA® available from Dassault Systemes or IBM is used to produce a solid model computer database of the tank 10. Other modeling programs could be used. This solid model 52 database is based on the tank geometry provided by the tank manufacturer, such as from conventional CAD drawings of the tank. Thus the solid model 52 database is defined by the geometric coordinates of the various surfaces and internal structures of the tank 10, in terms of the local x,y,z coordinate system of FIG. 1. Use of CATIA® to build solid tank model databases is well known to those skilled in the art and need not be further described herein in order to practice the present invention. The CATIA® program is actually used or can be used to produce a solid model of the entire aircraft. Thus, the present invention can be realized based on the assumption that the tank manufacturer or air frame manufacturer can provide the CATIA® database, or a solid tank 10 model database from another modeling program. CATIA® could also be used as the analytical tool, or another program such as PRO ENGINEER can be used, for example. If the database program is different from the tank model analytical tool program, the database can be converted to a format that is compatible with the analytical tool program.

The solid model database 52 is used as an input database to an analytical tool such as PRO ENGINEER® available from Parametric Technology Corporation. This program, or others conveniently available including the CATIA® program, has the feature of being able to "slice" the solid model 52 with planes at different heights in the tank 10 and at different attitudes thereof. This is illustrated in a representative manner in FIG. 1 with the slice line 61. Each planar slice 61 can be taken through the tank 10 at a selected height $H_z$ above the tank 10 origin, and thus corresponds to a simulated fuel or liquid surface height in the tank 10. For each slice taken, the analytical program tool 54 can calculate the volume of the tank portion defined by where the slice was taken. These slices can also be taken at different pitch and roll attitudes. Thus, for each slice 61 the tool 54 produces a data entry set that defines the relationships between liquid height, volume, pitch and roll.

By incrementally slicing the entire tank 10 for each incremental change in pitch and roll, the program tool 54 is used to generate a large look-up table 56 that defines all the relationships of liquid height to volume across all combinations of attitude in pitch and roll. Thus the database 56 defines a height to volume function $f_{vol}(P,R,H_z)$ where $H_z$ is the fuel plane height above the origin of the arbitrary local coordinate system, R is the roll data value and P is the pitch data value. Typically, the pitch and roll limits for the tank 10 will be specified by the aircraft manufacturer.

In addition to specifying the pitch and roll limits, the air frame or tank manufacturer may also identify certain tank 10 locations within the tank, or positions on the tank 10, that are not permitted for positioning a sensor 20. Such restrictions may also be inferred by the user based on the structural detail in the solid model and the selected sensor characteristics. For example, regions of the tank under structures that would obstruct acoustic energy towards the liquid surface would be excluded, such as regions under the pipe 18 in FIG. 1. Some areas within the tank or on the tank walls may not be suitable for mounting a sensor 20. These types of criteria for eliminating specific sensor locations are identified by function box 58, and this refers to the identification of locations in terms of local tank coordinates that are not acceptable to the end user for locating a sensor, and therefore cannot be part of an acceptable or optimum solution. This data can be provided, for example, as look up tables or simply coordinates that set a flag. This data is provided as a permitted sensor position database 57. This database 57 is made available to or accessed by the genetic algorithm as indicated in FIG. 2 by the function box 62. This database is generated by use of the analytic tool 54 based on the input from the restriction set 58. The database 57 thus provides the available domain of sensor positions for the genetic algorithm. The restricted locations may also be sensor specific where applicable.

In many applications, particularly aircraft fuel tank applications, some pitch and/or roll attitudes of the tank 10 may be more critical or important than other attitudes for fuel gauging purposes. The customer or end user may thus specify or identify relative importance of various attitudes. The designer then takes this relative importance information and assigns an importance value to each attitude. Different volumes can also be assigned importance values if required. In the exemplary embodiment, an attitude importance value is between 0 and 1 inclusive with 1 being the highest importance and 0 being lowest importance. The importance values are provided through an importance table database 60 as an input to the main tank model database 56. The final tank solid model database access 62 then, in this exemplary embodiment, makes available for use by the genetic algorithm, the height to volume lookup table 56 that establishes the relationships between $H_z$, pitch, roll and volume, and the restriction database 57 with specific coordinates flagged as being excluded from consideration for sensor location (restriction routine 57) and specified importance values assigned to various attitudes and/or volumes (importance table 60). The access function or interface 62 thus provides all the data needed to simulate sensor operation of detecting the liquid surface, because the tank 10 geometry is fully defined in terms of the local coordinate system, the sensor locations are defined by sensor position coordinates $(x,y,x)_s$ and the liquid surface height is defined by the $H_z$, P, R and volume relationships. Thus, simple trigonometry permits a determination of the fuel surface relative to each possible sensor position at every attitude and volume.

The importance database 60 and restriction database 57 are not required for practicing the invention, and further need not be used together but could independently be incorporated with the database 56. Thus, the genetic algorithm can utilize either the database 56 or another database that provides a solid tank model at different attitudes and volumes, as required for a particular application. In the exemplary embodiment, slice data is obtained in increments of one inch at pitch and roll attitude increments of one degree, respectively. These increments are exemplary in nature and should not be construed in a limiting sense. Slicing can be performed in half-inch increments, for example, or any other increment, as required to achieve a desired level of resolution.

The tank solid model database 56, therefore, is an important source of information used during the genetic search algorithm. An important aspect of the database 56 is that the data therein is based on the actual geometry of the tank 10, so that the gauging performance criteria or measures that are used to evaluate potential solutions will be directly a function of the tank geometry and not linear approximations or interpolations of fuel height location versus attitude, as may be done in prior systems that attempt to model a fuel tank for probe profiling, for example.

At this time it is noted that the algorithms and computations carried out as described herein can be performed on any conveniently available processing system, such as a SPARC ULTRA 2 workstation available from Sun Microsystems, Inc.(not shown) referred to hereinafter as the GA processor. Basic programming languages such as C++ and C can be used.

Figure 3:
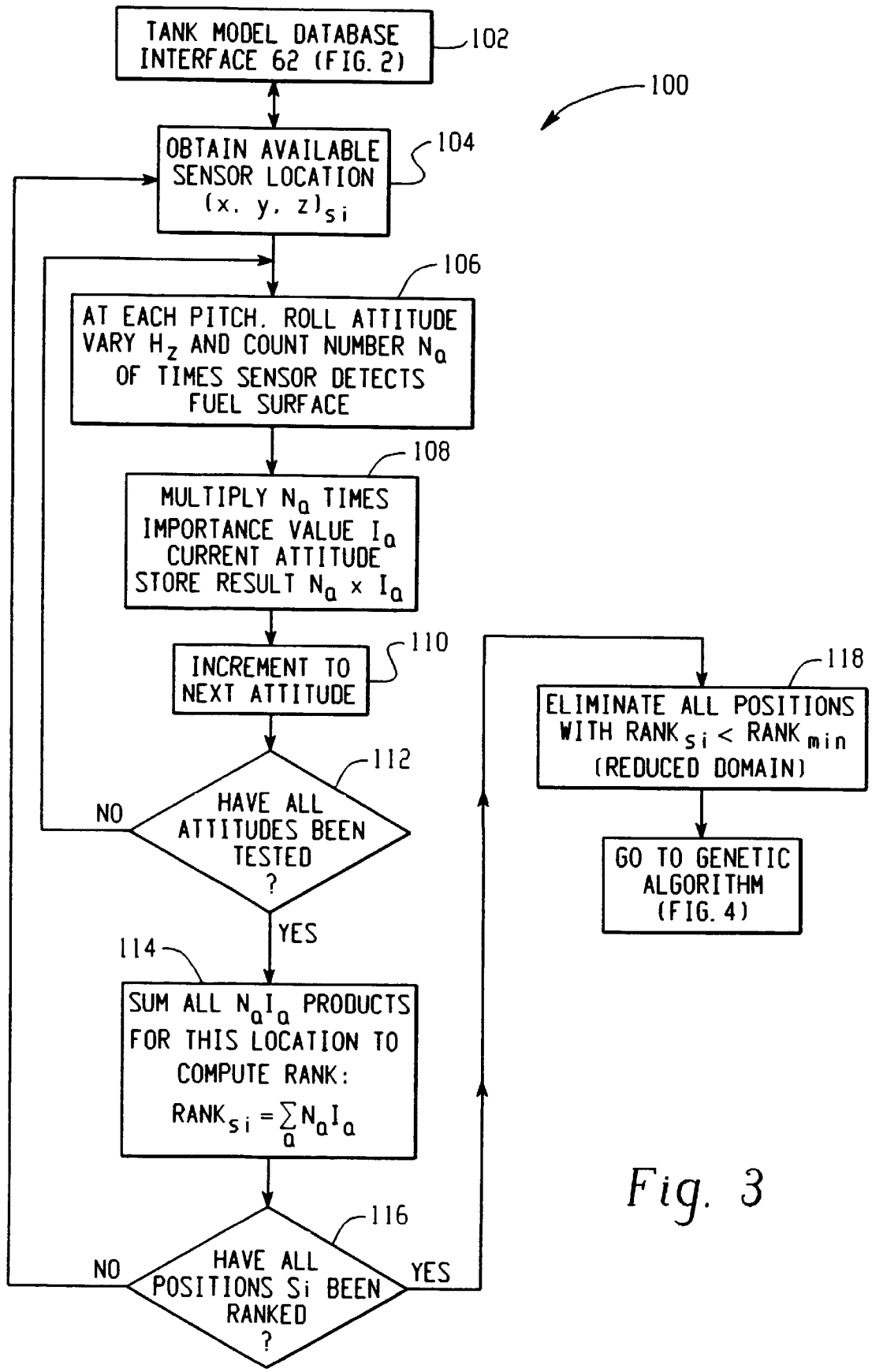
FIG. 3 is a software flow diagram of a pre-filter algorithm used to reduce the domain of possible solutions.

With reference to FIG. 3, a pre-filtering cost function algorithm 100 can be executed prior to executing the genetic algorithm search engine. The tank model database 62 (FIG. 2) is accessed during execution of the algorithm 100, as indicated by the double arrowhead to box 102.

As will be apparent based on the foregoing description, the tank model database 62 may well include a very large number of possible sensor positions to be searched, even after taking into account various restrictions such as may be imposed by the restriction database 57. This set of possible sensor locations is referred to herein as the domain of possible sensor positions, or simply "domain". Since the domain is usually going to be quite large, it may be desirable in some applications to attempt to eliminate some positions that are unlikely or least likely to provide an acceptable solution from the genetic algorithm. It is the purpose of the pre-filtering algorithm 100 to eliminate where possible those sensor positions that are unlikely to provide an optimum solution.

It is important to note that the pre-filter algorithm 100 is not required for the genetic algorithm, but using a pre-filter process can speed up the genetic algorithm because the domain of available positions that the genetic algorithm needs to search may be significantly reduced.

In this exemplary embodiment, the pre-filter algorithm 100 determines the ability of a sensor $S_i$ (where the subscript i refers to a specific sensor-in the exemplary embodiment, i=3) to detect the liquid fuel surface at all the variations of attitude (pitch and roll) and volume. This information is readily available from the database 56 by simple trigonometric calculations as described herein above because all the coordinates are known for the tank 10, the sensor $S_i$ position, and the height, volume and attitude relationships of the database 56.

Thus, at step 104 the processor obtains the first sensor position $(x_s,y_s,z_s)_i$ for the first sensor type (if different sensor types are used within a single tank, then the prefiltering algorithm 100 will likely be executed for each sensor type). At this first sensor position, the algorithm at step 106 will select the first attitude (e.g. pitch and roll both zero) and vary incrementally the simulated volume of liquid in the tank 10. The attitude and each incremental volume input (simulated from the slicing data) will define a height of the fuel plane above the local tank origin ($H_z$) and simple trigonometry permits computation of the height of the surface above the simulated sensor position $(x_s,y_s,z_s)$. Thus, at the first attitude, for each volume increment, the algorithm checks or tests whether the sensor will "detect" the fluid surface. The number of times the sensor detects the surface through all the incremental volume tests are counted up and noted as the value Na where the subscript "a" simply identifies the current attitude (pitch and roll condition). If importance data is being used, then at step 108 the value $N_a$ is multiplied by the respective importance value assigned to the current attitude used in step 106 and the product temporarily stored. If importance data is not being used, step 108 can be eliminated.

At step 110 the attitude is incremented to the next attitude condition, and at step 112 the algorithm checks if sensor performance at all attitudes has been evaluated. If not, the program repeats steps 106, 108 and 110 until all attitudes have been tested for the current sensor position. Note that there will be an $N_a*I_a$ product value at each incremental attitude evaluation. At step 114 a cost value RANKs is assigned to the just evaluated sensor position $(x_s,y_s,z_s)$ wherein the ranking value is the sum of all the $N_a*I_a$ products for the $(x_s, y_s, z_s)$ position. At step 116 the program checks whether all positions have been evaluated. If not, the program loops back to step 104 and evaluates the next available position for the sensor $S_i$. Thus, each possible position is assigned a cost or rank value.

After all possible positions have been evaluated and ranked, at step 118 the program simply eliminates or flags all sensor positions that have a rank value below a predetermined threshold $RANK_{min}$. The threshold can be selected based on how much reduction of the domain is desired prior to executing the genetic algorithm. The result at step 118 is thus a reduced domain of possible sensor positions that will be available to the genetic algorithm. A tradeoff is that if the rank threshold is set too high, positions that might otherwise be part of an optimum solution might be eliminated from the reduced domain of possible solutions to be searched by the genetic algorithm. Since the algorithm 100 is only intended to be a first order fairly rough estimate of a sensor's ability to detect the liquid surface at a given position, the threshold $RANK_{min}$ should not be set too high. But its value lies in the ability of the pre-filter to eliminate those positions at which the sensor performs poorly and therefore does not likely represent a position that could be part of an optimum or acceptable solution.

Figure 4A:
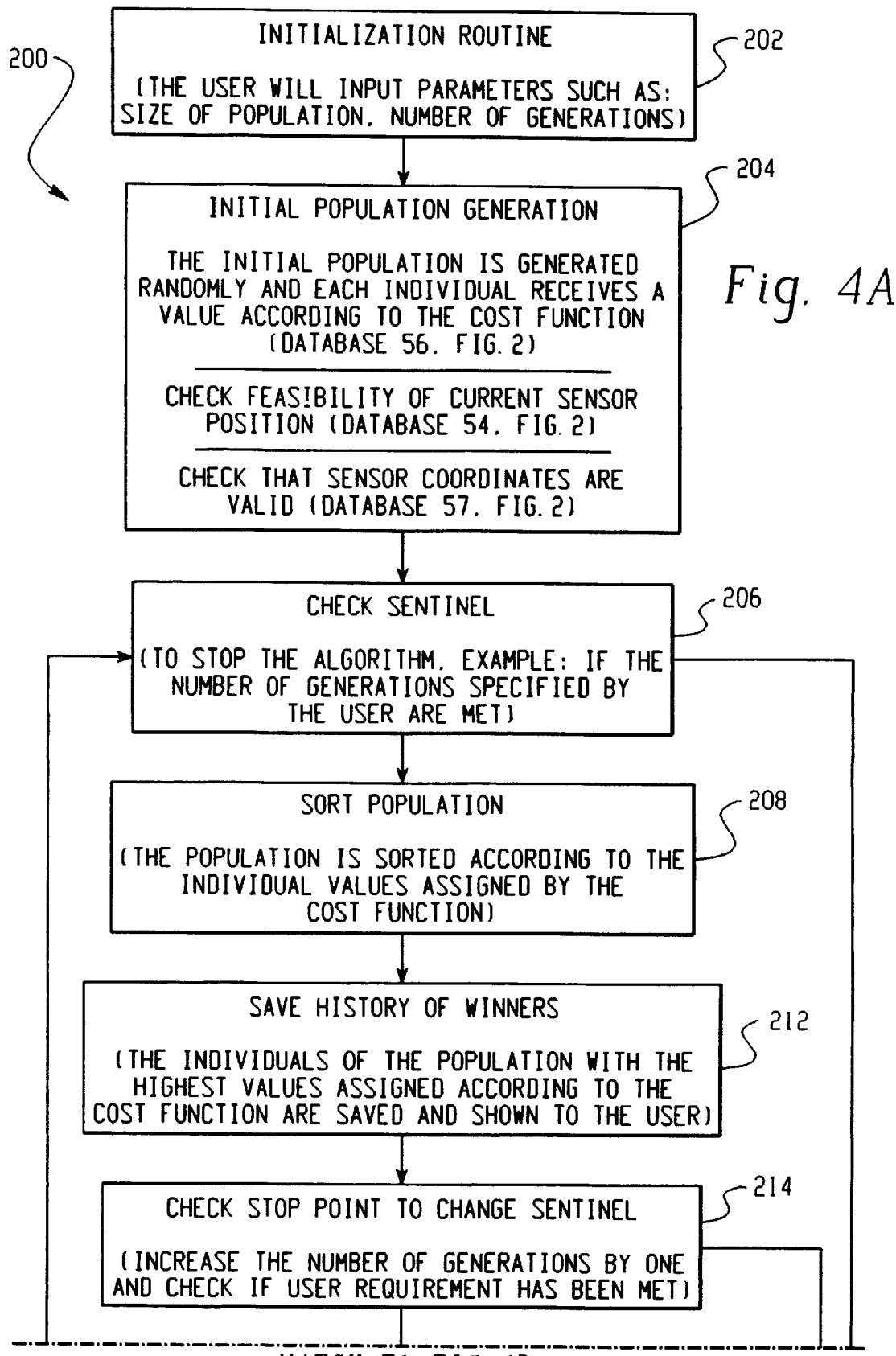
FIG. 4 is a detailed software flow diagram for a genetic algorithm in accordance with the present invention.
Figure 4B:
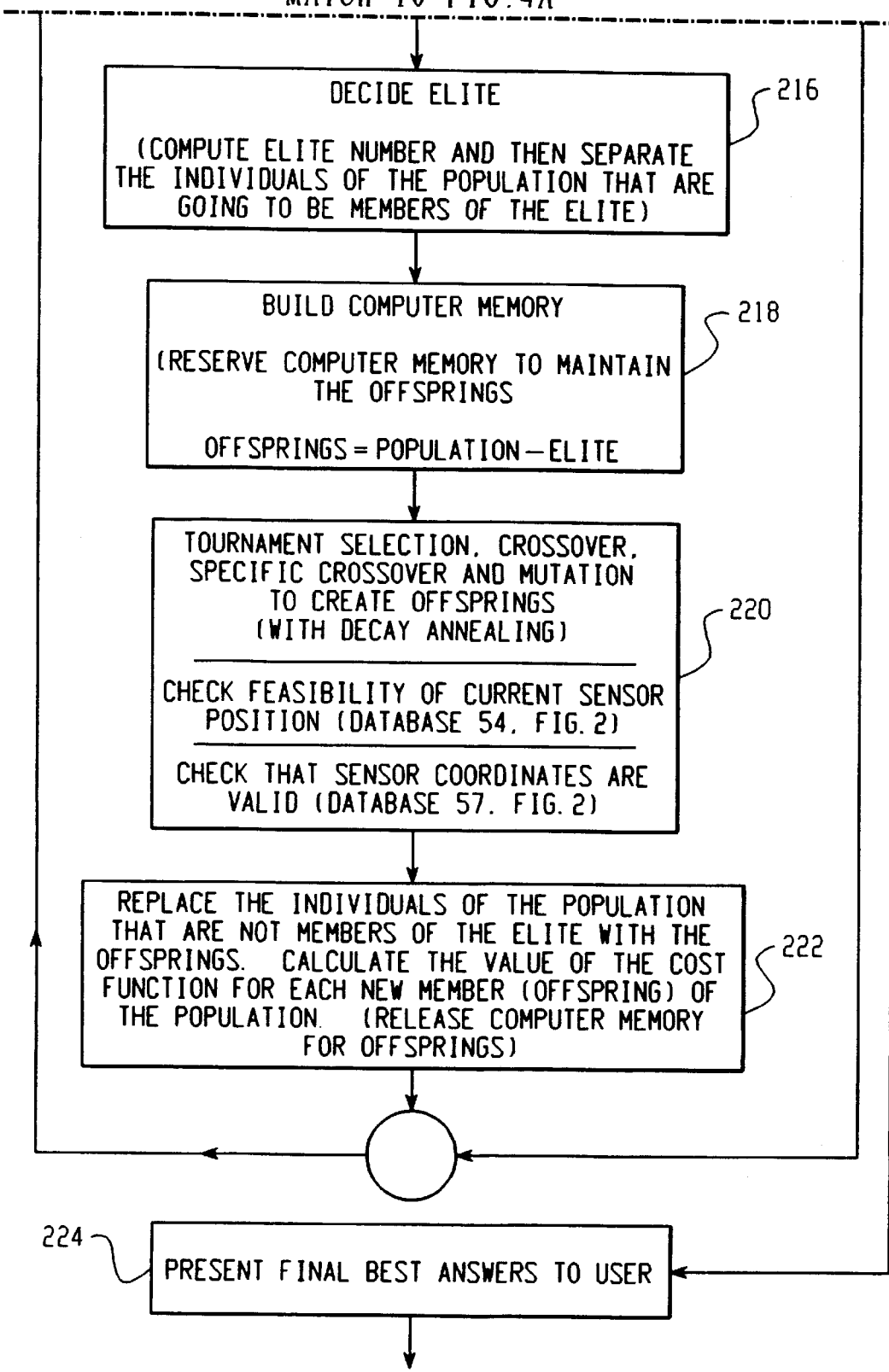

With reference next to FIG. 4, an exemplary embodiment of a genetic algorithm 200 in accordance with various aspects of the invention is provided. In a manner similar to the prefilter algorithm 100, the genetic algorithm 200 can be executed in software by any conveniently available processing system such as the GA processor. For convenience, the genetic algorithm is also referred to herein by the shorthand notation "GA" 200.

In order to explain the genetic algorithm 200, some terminology will now be defined. A basic concept of a genetic algorithm is that a possible solution is described in terms of an individual. An individual is characterized by a respective chromosome. Each chromosome has a number of genes, and the chromosome or individual represents one possible solution. A group of individuals makes up a population of possible solutions that is searched by the GA 200. But beyond searching, the GA also selects, mates, mutates and crosses individuals to produce offspring which form a new generation of individuals. For each generation of individuals, the GA must check that each individual is a valid possible solution, meaning that the sensor positions that define the individual's genetic make-up (i.e. the chromosome) are within the reduced domain of possible sensor positions. As will also be described herein, each individual in a generation is also evaluated to a cost function as will be described hereinafter in an exemplary embodiment.

Figure 5:
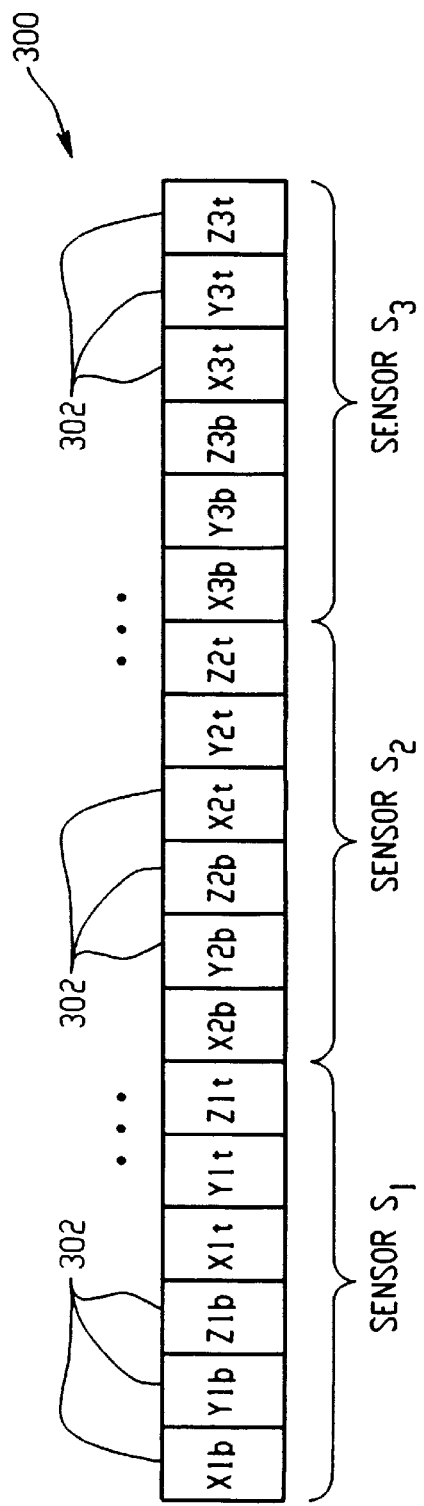
FIG. 5 is a representation of a chromosome structure used in one embodiment.
Figure 6:
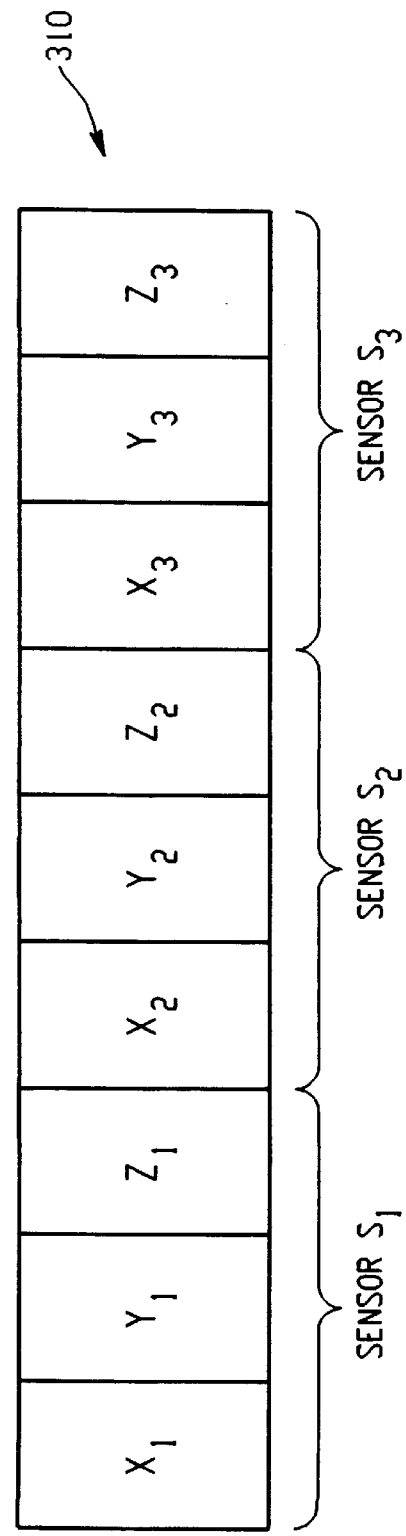
FIG. 6 is a representation of a chromosome structure alternative embodiment.

As an example, in the exemplary embodiment a desired or acceptable solution are those positions of the "i" sensors to achieve a desired accuracy of volume measurement across numerous attitudes. The exemplary embodiment considers three sensors (i=3), but the GA is very flexible in that it can search for the optimum solution for any number of sensors (thus allowing comparison of performance using different sensor numbers and combinations of types of sensors). For three sensors, a possible solution can be expressed as the x,y,z position coordinates of each of the three sensors. FIG. 5 thus shows a typical chromosome 300 of an individual for the exemplary embodiment. Each gene 302 is a coordinate for one of the x, y or z axes of a respective sensor position, as noted. FIG. 5 is a chromosome for sensors in the form of internally mounted capacitance fuel probes of conventional well known design. Each fuel probe Si (for i=1 through 3) has two coordinates, one coordinate for the probe's top position (subscript "t") and another coordinate for the probe's bottom position (subscript "b") positions. FIG. 6 shows a suitable chromosome structure 310 for an ultrasonic sensor group. The only difference is that each of the ultrasonic sensors only requires a single set of coordinates to define the sensor's position relative to the tank 10.

The reduced domain of possible sensor positions obtained at step 118 of FIG. 3 provides all the coordinates of available sensor positions. At step 202 (FIG. 4) the GA is initialized by the operator specifying the population size and the number of generations that will be produced. In the exemplary embodiment, each generation is a population 320 of six hundred (600) individuals, and fifty (50) generations will be produced (prior to an annealing process to be described herein after). The larger the population and number of generations, the more computer time intensive will be the execution of the GA 200. Other stopping points for the GA may be, for example, number of iterations, number of anneals, number of repeat solutions, computing time, or any combination of these. This list is not exclusive. (For clarity herein, numeric values such as "(50) generations" are enclosed in parentheses.)

At step 204, the initial population 320 is generated by the program randomly selecting (600) individuals. Each individual is randomly created by a random selection and grouping of three sensor positions. A random number generator can be used to perform the random creation of the initial population 320. FIG. 7 illustrates the general idea of the initial population 320 having (600) individuals, each with a chromosome 300 that defines a possible solution to the problem of placing three sensors at the specified coordinates (identified by the individual genes) to obtain optimum volume measurement across a variety of attitudes.

In the described embodiment, an acceptable solution or optimum solution is defined as that solution or solutions that meet a system 1 performance criteria such as predetermined volume measurement accuracy. Measurement accuracy is one example of a system 1 performance criteria. Other performance criteria, either in addition to or separately defined could be used as the performance criteria, including cost, reliability and so on. As another example, the genetic algorithm could simply be executed through a selected number of generations, and the best solution at that point taken as the acceptable solution. Thus, the performance criteria selected determines the cost function. A cost function is a measure of how well each potential solution (i.e., each individual) meets the system 1 performance criteria. The cost function used in the GA 200 is thus an important aspect of the invention, in that the cost function essentially defines which individuals perform to the required performance criteria. In general then, the cost function is a measure of a candidate solution's ability to meet a predetermined system performance criteria. In the exemplary embodiment, the GA cost function is a measure of a candidate solution's (herein "candidate" solution and "acceptable solution" and "possible" solution and "optimum" solution are all used interchangeably) ability to accurately gauge volume of liquid in the container (e.g., fuel volume in a fuel tank) over a range of container attitudes and volumes. Each individual in a generation is evaluated to the cost function and a cost function value is calculated and tracked for each individual. The cost function values are then used to identify the strongest candidates for purposes which will be described hereinafter.

Figure 8:
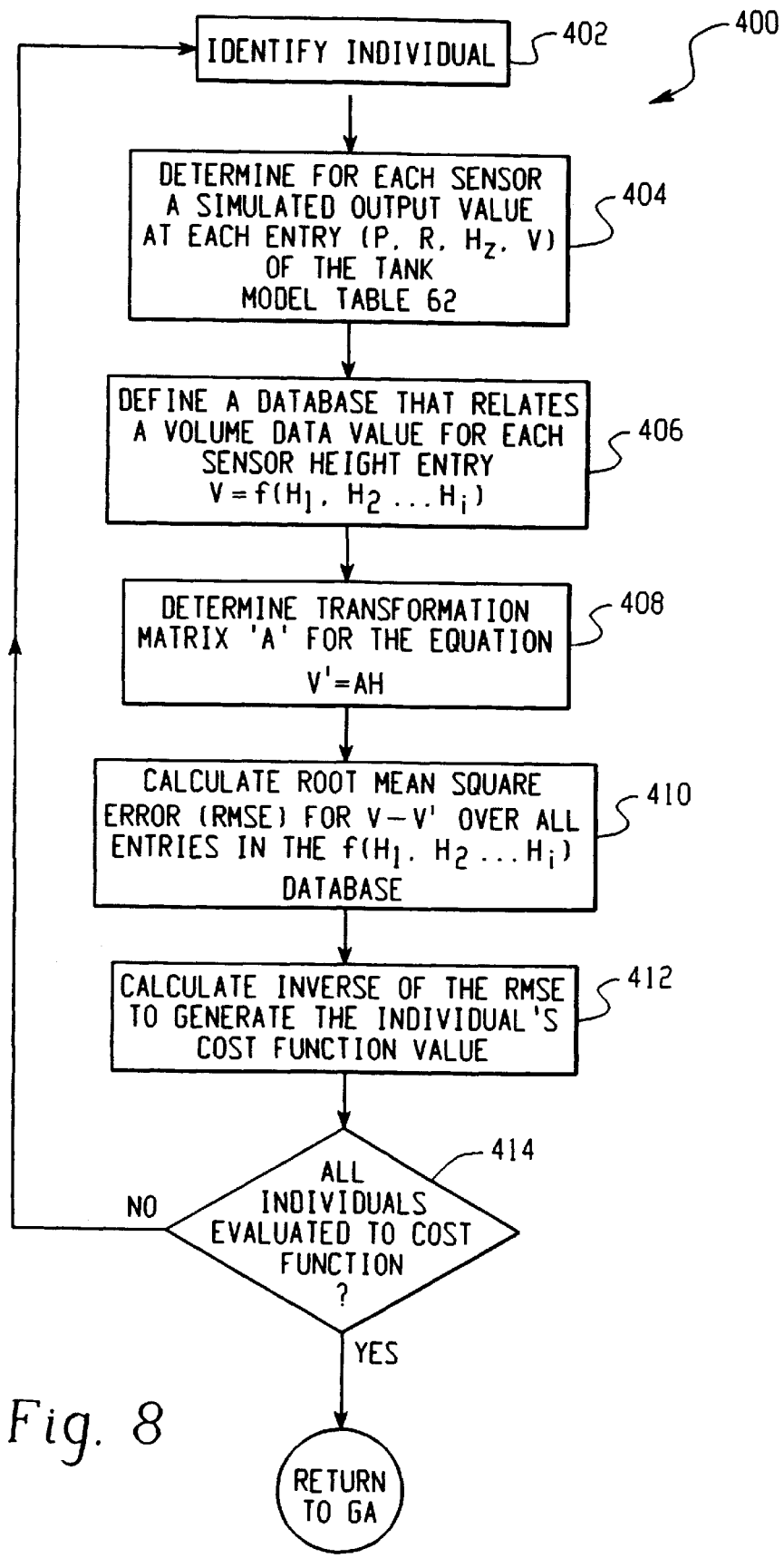
FIG. 8 is a logic flow diagram for a cost function algorithm suitable for use with the present invention.

As noted, at step 204 the initial population 320 is randomly selected by the GA processor from the reduced domain of the database 56. For each individual selected, the individual is evaluated or tested to the cost function. In the exemplary embodiment, the cost function is based on the ability of the individual to accurately measure liquid volume across a range of attitudes and volumes. In order to carry out the cost function, a suitable algorithm is presented in FIG. 8. This cost function algorithm 400 in effect determines, for each individual 320, the accuracy of a volume measurement at different attitudes, wherein each individual is defined by a set of coordinates for each of the three sensors $S_i$ that make up the individual. This cost function 400 is evaluated for each individual in each generation (the initial population and each succeeding population as defined by a new generation of individuals) as it represents the measure by which individuals survive and also is the measure by which it is determined that an individual satisfies the desired or acceptable/optimum solution.

At step 402, an individual is accessed from the population. When the GA 200 first starts, the first population will be the initial population 320. At step 404, the tank model database 62 is used to determine a simulated sensor output for each of the sensors in the individual's chromosome 300. These simulated sensor outputs can easily be derived trigonometrically because for each entry in the database 56, the GA processor has data on the attitude, a plurality of liquid surface plane heights ($H_2$) and volume at each such height. The known height $H_2$ easily converts to a sensor fuel height output value (e.g., $H_1$ being the simulated output value for the first sensor in the individual's chromosome) because the database 56 contains all the coordinate information for the fuel plane and attitude, and the chromosome specifies the coordinates of the three sensors of the individual under evaluation.

For all entries in the database 56, the GA processor determines a sensor height ($H_1$, $H_2$, and $H_3$) and also knows the corresponding volume and attitude information. Note that the values $H_1$, $H_2$, and $H_3$ are simulations based on what actual sensors would measure for the liquid height if three such sensors were placed at the positions in the tank corresponding to the coordinates identified in the individual's chromosome. The algorithm at step 406 thus builds a large table or database that defines the relationship $V=f(H_1, H_2, H_3)$. V in this equation is the true volume which is known from the slicing data used to create the database 56. Thus, at all different sensor height combinations a true volume value is known (the different combinations result from the observation that the database at step 406 is built from evaluating sensor height readings across a large number of attitude and volume variations). The importance of this information lies in part by noting that the volume accuracy measure for the possible solution (i.e. the individual being tested to the cost function 400) is based on actual tank dimensions and attitudes.

Thus, at step 406 the GA processor has a large database that defines the relationship between volume and the sensor heights across a wide variety of attitudes and volumes. If in any particular application there was an unlimited amount of memory available, one could simply store all this data as a massive look-up table and then use the look-up table to convert actual sensor readings to volume. Several problems are associated with this approach. First, tremendous amounts of data would need to be stored in the fuel gauging system memory if look-up tables are used an option but not a feasible option in some applications. Second, sensor noise would inevitably result in sensor readings that did not precisely fit an entry in the look-up table, thus requiring some form of linear interpolation. Third, most look-up tables of this type are indexed to the pitch and roll values. Further indexing to account for noise or other factors would require even more memory.

Alternatively, a neural network could be trained to learn the data in the database obtained at step 406. The neural nets would reduce the memory requirements for the GA processor performing the genetic algorithm. However, to use neural nets for this function would require that a neural net be trained for every individual in every generation. Note however, that as described in the above referenced patent applications, a neural network is trained for use in an actual fuel gauging system to execute the function $f_{vol}(A,B,D)$ where A and B are the pitch values and D is the height coefficient or value for height of the liquid surface above a sensor (in the actual fuel gauging system the sensor locations are fixed, preferably at optimum positions as determined by the genetic algorithm). Alternatively, a neural net could be trained to learn the function $V=f(H_1, H_2, H_3)$.

For the genetic algorithm 200, however, a more suitable approach in the exemplary embodiment is to use a simple multiple linear regression ("MLR") technique at step 408 to generate a linear transformation matrix A for the matrix equation $V'=AH$, where $V'$ is the estimated volume measurement for the individual at each specified height parameter H (H being the height matrix for $H_1$, $H_2$, $H_3$).

Thus, for each known volume value V, the equation $V'=AH$ can be computed and an error $E=V-V'$ determined. This error is determined across the entire range of attitude and volume variations in the database from step 406. The root mean squared error (RMSE) over all table entries for the individual is then calculated at step 410, producing a value that indicates how accurately the individual can measure volume. At step 412, if desired, the RMSE value is inverted to produce a cost function value for the individual. The RMSE value is a scalar number that can be expressed in terms of percent accuracy. Thus, the more accurately an individual measures volume across all attitudes and volumes, the smaller the RMSE value thereof. The overall performance criteria for a fuel gauging system may be, as an example, require an RMSE accuracy of 0.2%. Therefore, the genetic algorithm will search until an individual is found that has an RMSE value of 0.2% or less. The corresponding cost function in this embodiment is 1/RMSE or five hundred (500). Once one solution is found with a cost function value that exceeds this performance criteria, the genetic algorithm can be stopped. The user can decide whether to search for more or better solutions, or to change a variable such as the number of sensors and execute the genetic algorithm again perhaps with additional cost functions applied. These are just a few examples of the overall flexibility of the present invention in optimizing sensor placement for a fuel gauging system 1.

It is important to note that although in the exemplary embodiment the cost function 400 is computed with a linear approximation, it still represents an accurate and valid way to measure the individuals in the population. The MLR technique is perhaps somewhat less precise in its approximation than would be, for example, a neural network. However, it can also be concluded that if an individual (i.e., a candidate solution) satisfies the performance criteria as measured by the MLR based cost function, then that solution will also meet the performance criteria when used in an actual fuel tank 10 and processed by a neural net (as in the related patent applications identified herein). The use of MLR simply provides a computationally easier and faster processing method to reduce some of the computer time required to execute the genetic algorithm 200.

At step 414 the program checks if all (600) individuals in the population have been evaluated. If NO, the program loops back to step 402, gets the next individual in the population and tests it to the cost function 400. If the result at step 414 is YES, the GA processor returns to the core GA algorithm of FIG. 4 at step 204.

At step 204, after all the individuals in the initial population 300 have been evaluated to the cost function 400, the program advances to step 206. Step 206 is a simplified sentinel check to determine whether the limit of the number of generations (specified as an input at step 202) has been met. Since in the present example, we are at the initial population, the program advances to step 208.

At step 208 the genetic algorithm 200 sorts the (600) individuals in the initial population 300. In this exemplary embodiment, the individuals 300 are sorted by rank in accordance with their cost function value computed during step 204. For subsequent generations, the cost function is calculated at step 208 for each individual before sorting. The cost function value, as computed in the exemplary embodiment, is a scalar value that is larger for those individuals that more accurately measure volume of liquid in the modeled tank 10.

At step 212, in this exemplary embodiment, a list of the "winners" as measured by their cost function values, can be created and saved for the user. The list can also be presented or shown to the user through an appropriate output display or device conveniently used with the GA processing system. At step 214 the algorithm checks whether any individual has met the performance criteria. If the ranking at step 214 reveals a winner (i.e., an individual that meets the cost function performance requirement), the genetic algorithm can be stopped (or continued if so desired). Assuming, as is likely the case, that the initial population 300 does not have an individual that meets the performance criteria as measured by the cost function, the system advances to step 216.

Assuming for purposes of this explanation that the genetic algorithm 200 continues at step 216, the sorted list of individuals from step 208 is reviewed for a predetermined number of "elite" individuals that, by definition, survive to the next generation without any mutation or cross over. The number of elite individuals selected is an input by the user. In the preferred embodiment, the number of elite is fifty. The elite number should be large enough to assure that the best individuals (as measured by their cost function values) survive into the next generation, because their high cost function values suggest that those individuals may be positionally close to an acceptable solution. But the elite number should not be set too high, because the GA works better by evaluating many different individuals.

In this embodiment then, fifty elite individuals, namely the individuals with the fifty highest cost function values, are temporarily set aside at step 216 and will survive to the next generation. The elite individuals are able to participate in the mating function for producing "offspring", but the elite individuals are not replaced by any offspring for the immediately succeeding generation. The remaining (550) individuals in the initial population essentially are "killed off" in that they likely will not survive the crossover and mutation processes used to produce the succeeding generation. This does not hurt the search process because these individuals already are known to not be acceptable solutions, based on their cost function values being too low compared to the performance criteria.

In the exemplary embodiment, the number of elite individuals has an upper and a lower limit. The elite number is calculated (and re-calculated if so desired throughout the GA process) by use of excursion sets.

An excursion set $A_u$ at a given excursion level parameter u, for any objective function f(x) can be determined by the following execution:

$$A_u = \{x_i : f(x_i) > u\}$$

In other words, the elite set $A_u$ is composed of individuals that exhibit performance better than a threshold value u. the value "u" can be a moving threshold. This threshold u is calculated for each generation and, in the exemplary embodiment, is the calculated mean of the cost function of the entire population of the current generation.

In the embodiment herein, the elite number is assumed to be (50).

The remaining (550) non-elite individuals in the initial population 300 are eventually replaced by a corresponding number of offspring that are produced for the next generation.

Thus, the genetic algorithm 200 always analyses populations of (600) individuals, as noted at step 218 wherein the algorithm reserves enough computer memory to keep track of the potential offspring until the actual offspring are identified.

At step 220 the new offspring to replace the (550) non-elite "losers" in the initial population are created. The processes related to or involved with creating the new offspring, in this exemplary embodiment, include tournament selection, crossover, mutation and decay annealing. Decay annealing is implemented typically only after many generations have been processed, as will be further explained herein. The various processes may or may not be individually or collectively required in all genetic algorithm search engines for optimizing the search.

Figure 9:
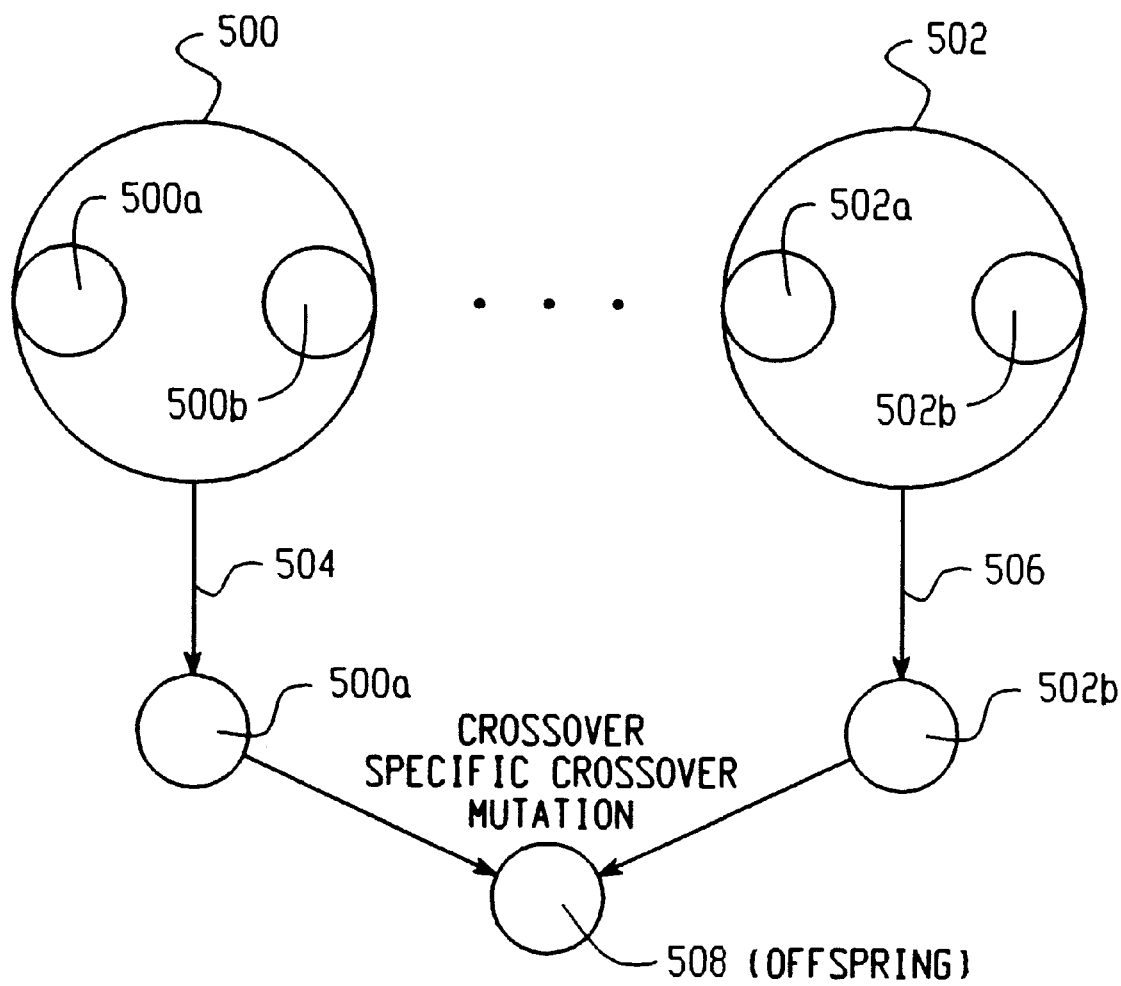
FIG. 9 is a schematic representation of a tournament selection process.

The tournament selection process, illustrated in FIG. 9, is the first step in producing a new generation of offspring. By tournament selection is meant that the processor randomly selects (550) pairs of individuals from the initial population of (600) individuals. Note that the tournament selection pool preferably but not necessarily includes individuals that may have also been designated as "elite". This is because the paired individuals eventually will not survive intact to the next generation-only the elite individuals advance unchanged to the next generation. It is important to note that the elite individuals may well change every generation. The new elite of each new generation are always based on the cost function values that are computed for each individual for each generation. Thus, nothing guarantees that an elite individual, or any of the elite individuals in one generation, will also be in the elite group in the next generation, because a "better" solution may end up being created in the succeeding generation.

FIG. 9 illustrates two of the randomly selected pairs, 500 and 502. The first pair 500 includes two individuals, represented by the circles 500a and 500b. The second pair 502 includes two individuals 502a and 502b. A total of (550) such pairs are selected in toto (for a total random picking of eleven hundred individuals, thus some individuals from the initial population will be randomly paired with other individuals more than once). For each pair 500, 502 their associated cost function values are compared, and the individual with the highest value is identified, as at 504 and 506. In this example, we assume that individual 500a and individual 502b had the higher cost function values from their respective pairs. As further represented in FIG. 9, these two "winners" become paired or "mated" in order to produce one offspring 508. The mating process includes crossover, specific crossover and mutation. Thus, the tournament selection process of FIG. 9 produces (550) mated pairs of individuals that will, eventually, each produce a single respective offspring 508, thereby replacing the (550) non-elite individuals "killed off" from the initial population. The genetic makeup, or chromosome of each of the offspring 508 will in most cases be different from the chromosomes of either "parent" 500a, 502b. When the offspring 508 is not genetically different from one of its parents, a specific crossover process is carried out as will be explained herein. In the early generations, typically the offspring are genetically different from the parents.

Figure 10:
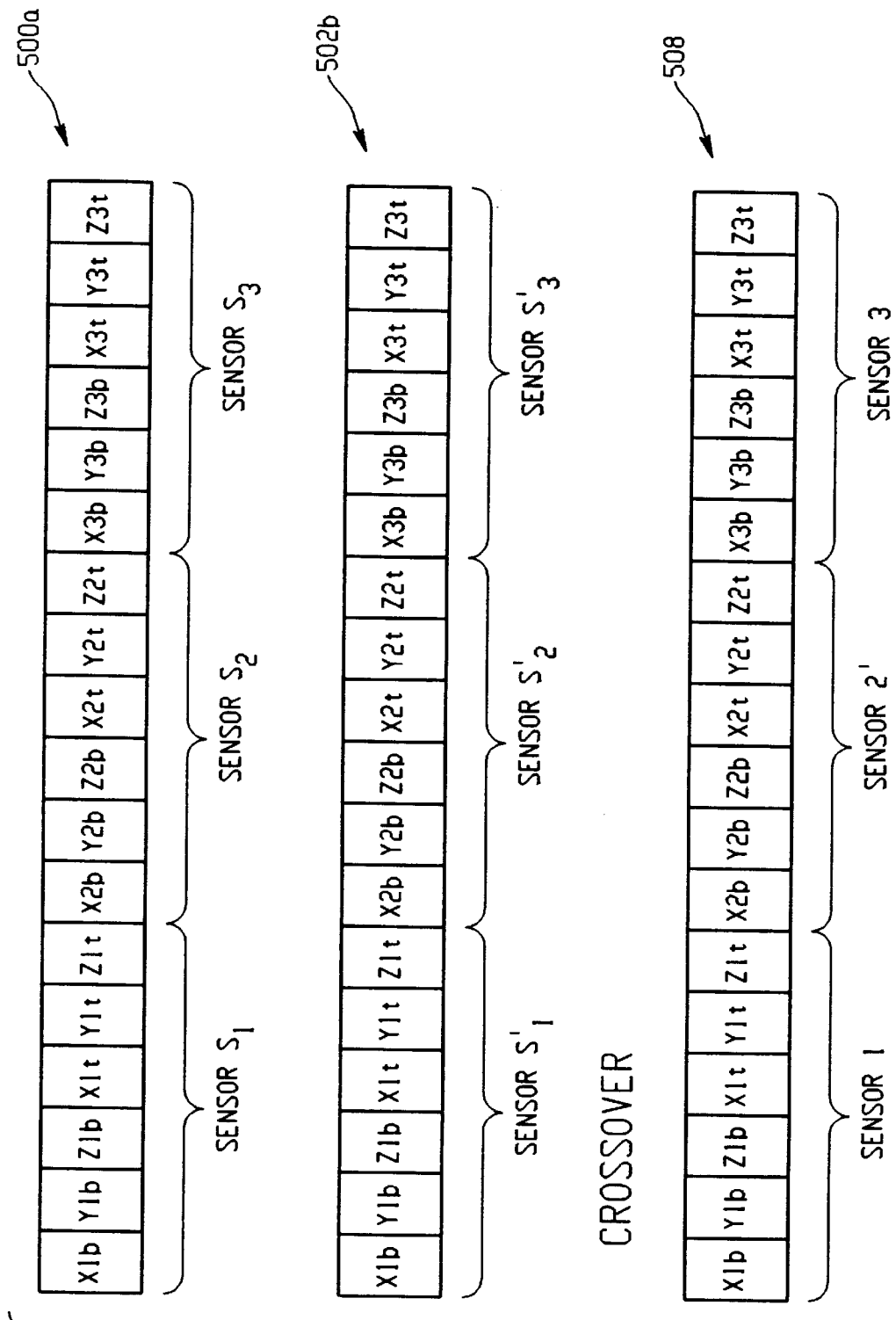
FIG. 10 illustrates a crossover process.

FIG. 10 illustrates a suitable crossover process. Continuing with the example from FIG. 9, the top sequence in FIG. 10 is the chromosome for one parent 500a (note that the exemplary embodiment herein is for internal fuel probes which have a chromosome structure as in FIG. 5 previously described herein) and the second sequence is the chromosome for the other parent 502b. Each chromosome contains the associated sensor coordinates for the three sensors that comprise each individual. An apostrophe symbol is used to distinguish the sensor gene groupings of the two parents.

For crossover to occur, the processor computes a probability of crossover value. This probability value is computed based on the Euclidian distance between the parents 500a and 502b (for example) on a sensor by sensor basis. The Euclidian distance is directly calculated from the coordinates of the sensor positions for the parents. The computed ratio of the Euclidian distance to the maximum distance, is multiplied by a random number. The random number is generated by a random number generator and is between 0 and 1, with equal probability for every value (i.e. a uniform random generator is used). The maximum distance is simply the maximum distance that a sensor position could be moved from its current position. This distance is available from the solid model database 56 because the current sensor position coordinates are known. If the random number is less than the computed ratio, then crossover occurs, and all the genes of the baseline parent are replaced with the genes of the other parent (again only on a sensor by sensor basis).

In essence, the probability of mutation is a function of the Euclidian distance between the genes of corresponding sensors in the two parents 500a and 502b. One of the parents is arbitrarily designated as the baseline chromosome for the offspring. In this example, the parent 500a is the baseline parent. The Euclidian distances between the sensor S1 genes and sensor S1' genes are used to calculate the crossover probability function. The same is done for the S2, S2' and S3, S3' sensors. The probability value indicates a bias toward one of the gene sets of one of the parents. If the bias is towards the baseline parent, then that parent's genes pass through to the offspring 508. If the bias is towards the other parent, then that parent's genetic code "crosses over" to the offspring. In the example of FIG. 10, it is assumed that the baseline genetic code for sensors S1 and S3 passed through to the offspring 508, but that the genetic code for the other parent 502b crossed over to the offspring 508. Crossover is performed on a sensor by sensor basis (as distinguished from a gene by gene basis as is used in specific crossover and mutation).

In early generations, crossover is likely to occur frequently because the parents are likely to be genetically far apart (representing sensor locations that are far apart). But as the genetic process continues, parents tend to become more and more similar and crossover may not occur as frequently.

Another mating process is mutation. It is important to note that even if crossover occurred, the offspring is not yet determined (in this embodiment). All the mating processes of crossover, mutation, specific cross over, and when applicable decay annealing, occur or are evaluated before an offspring is created. During the various mating processes reference is made to each offspring as a "potential" offspring. This also explains why a fairly substantial memory must be reserved during the mating process (see 218 of FIG. 8), as the potential offspring must be tracked throughout all the processes 220, and this is done for all (550) offspring that must be created to replace the non-elite individuals. And this occurs for each generation iteration in the genetic algorithm 200.

Figure 11:
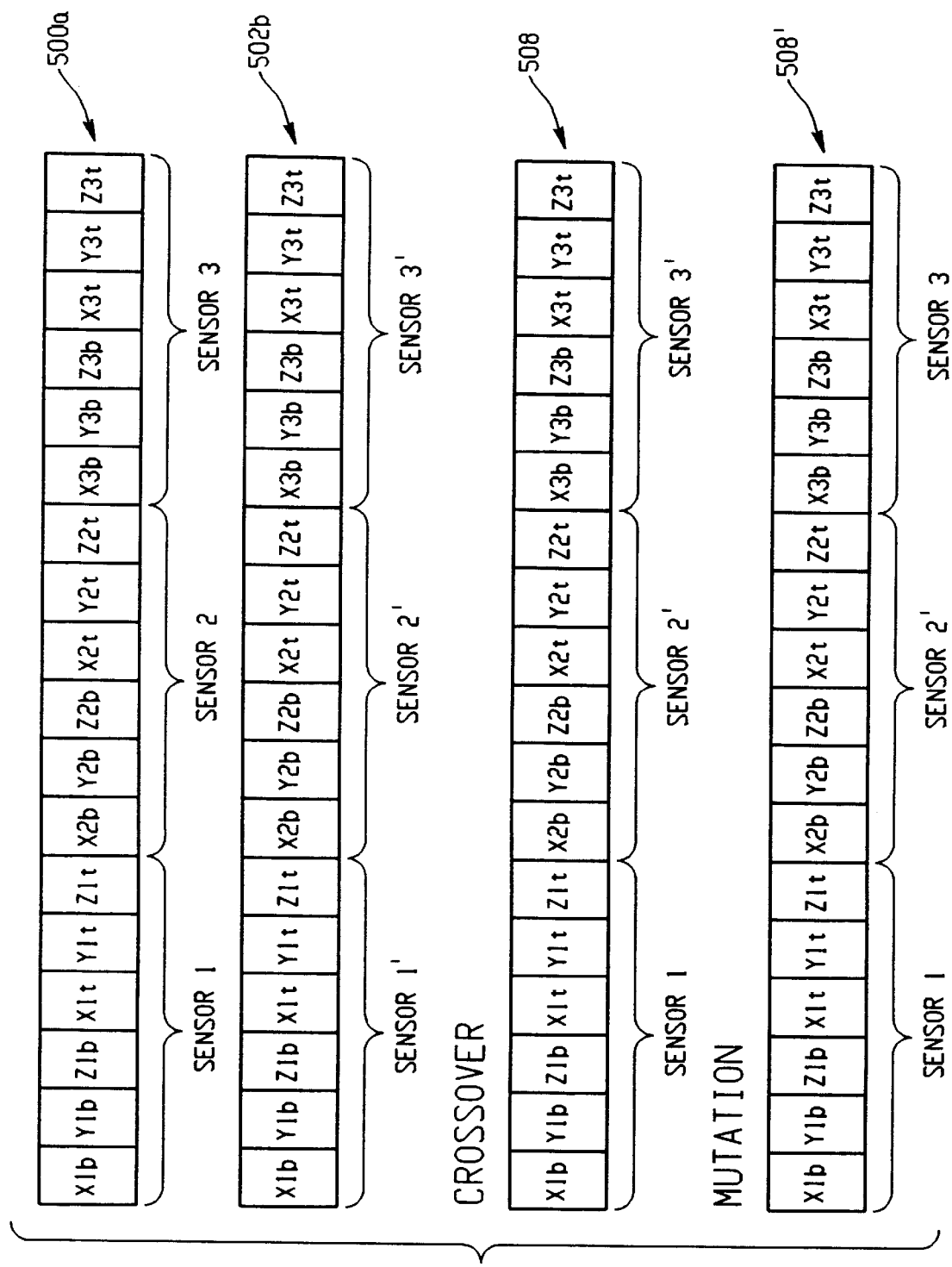
FIG. 11 illustrates a mutation process.

The mutation process is illustrated in FIG. 11. Here the first three diagrams are the same as the example in FIG. 10 (assumed a crossover occurred). Mutation is a process that occurs, typically in later generations, when the genetic makeup between the potential offspring and the parents is too similar. A mutation probability value is calculated in a manner similar to the crossover probability.

Mutation is analyzed on a gene by gene basis. The distance between the genes (in this case the distance is simply the difference of the coordinates along the respective axis) is divided by the maximum distance to obtain a ratio. The maximum distance again is determined by the current position and the maximum distance it could be moved as delimited by the solid model information in the database 56. A uniform random number generator is used to produce a number between 0 and 1, and if the random number is greater than the ratio, then mutation occurs. If the mutation probability value indicates mutation is to occur, the mutated gene is moved a distance that is defined by a calculation that is time based, where in this embodiment "time based" means based on the number of generations produced.

In the example of FIG. 11, it is assumed that the mutation probability value forced a mutation in three of the genes of the potential offspring 508, specifically in this example genes Z1b, Y2b and X3b. This is just an example. The distance each gene is moved by its mutation is defined by a Gaussian random generator. The standard deviation of this random generator is SD, which is calculated as SD=Decay Factor * Range.

Figure 12:
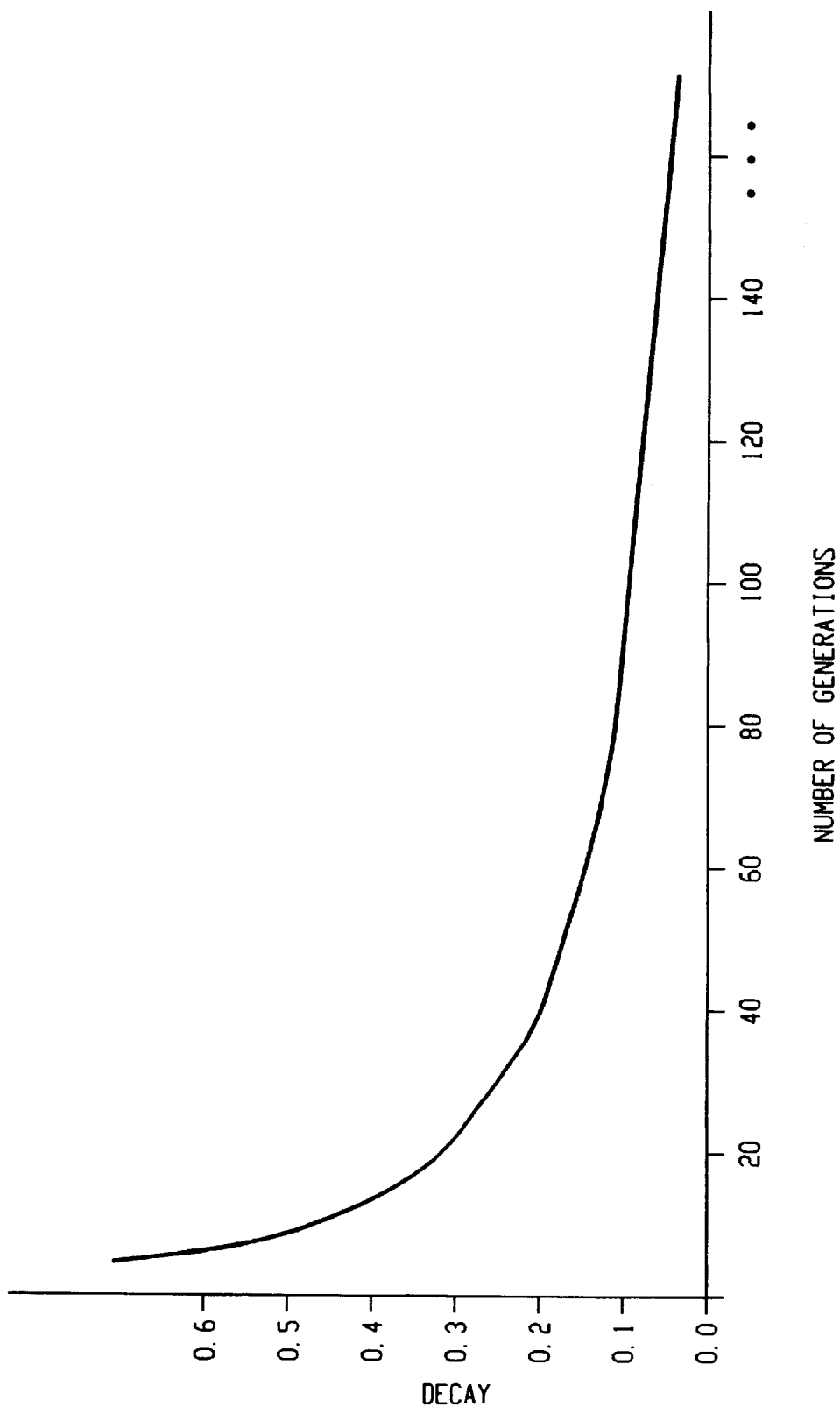
FIG. 12 illustrates a decay factor value used for mutation.

The decay factor is a number between 0 and 1 and in the exemplary embodiment is time based, meaning that the decay factor decreases as more and more generations are produced. FIG. 12 illustrates a typical time based decay factor. The Range value is simply a number that is predetermined before the GA 200 is executed, and represents how much a sensor coordinate can be moved for a single generation. The range value is a listing of possible geometric locations that the sensor could be moved based on its current position (taking into consideration structural and geometric constraints). This range value thus can change from sensor to sensor. The effect of the decay factor is to reduce the mutation distance of a mutated gene as more generations are produced, somewhat analogous to "tweaking" or fine tuning the possible solutions.

As the number of generations increases, it becomes more and more likely that a potential offspring, even after crossover and mutation, will be identical to one of the "parents". When this occurs, specific crossover is implemented. The parent with the identical genes is the baseline chromosome. Specific crossover refers to a process by which an exchange of genes from the other parent occurs on a gene by gene basis. The same distance ratio between the genes is calculated as in the case of mutation. In other words, the ratio is of the distance between the genes divided by the maximum distance the gene could be moved from its current value. A uniform random generator is used to produce a number between 0 and 1. If this number is less than the calculated ratio, then specific crossover occurs.

Referring back to FIG. 4, in the early generations, such as the initial population 300 for example, crossover and mutation will sufficiently differentiate the potential offspring. The new set of (550) individuals are then grouped with the fifty elite and a new generation of (600) individuals is thus created. At step 222, each individual in this new generation is evaluated to the cost function and assigned a cost function value, as described in connection with FIG. 8. The program then loops back to step 206 and if the maximum number of generations has been created, the program exits at step 224 and presents the best solutions (i.e. the individuals with the best cost function values). If the maximum number of generations has not been created, then the GA 200 repeats the process through steps 208–222 to produce another generation. Each new generation has all its individuals tested to the cost function to see if any of the individuals meet the performance criteria. Each generation also starts with the elite individuals from the preceding generation.

Each time an offspring, or potential offspring, is created through mutation or specific crossover of a gene, the program re-checks the database 57 (FIG. 2) to verify that the new coordinates of the individual fall within the reduced domain of allowed positions for the respective sensor. No individual is allowed to exist that has an invalid set of sensor coordinates (this check is also performed throughout the GA on any randomly created or selected individual's sensor positions). For sensors with top and bottom coordinates, such as capacitance probes, the algorithm 200 determines based on the database 54 (FIG. 3) if the individual's sensor coordinates are within a feasible location. A "feasible location" is a sensor location in which along the entire length of the sensor's sensing area (e.g. a cylinder defined by the geometry of a capacitance probe, or a cylinder defined by the acoustic path of an ultrasonic sensor) the sensor does not extrude or interfere with a tank surface or internal structure. This determination can be made, for example, by a simulated fuel displacement calculation based on the sensor geometry. For example, the sensor geometry will specify a volume of liquid that would be displaced by the sensor being placed at the position in question (in the case of a capacitance probe, for example). The database 56 can be used to determine a simulated displacement by having the probe "volume" displace liquid volume. If the simulated displacement is less than the expected displacement, then the designer knows that the sensor interferes with the tank or a structure in the tank, and the corresponding position of the sensor is not feasible and can be flagged as such.

Note that the crossover, mutation and specific crossover processes, as well as annealing, are executed by the GA processor simply by storing and updating or modifying in a memory the gene values for each individual's chromosome. Simple arithmetic operations carry out these processes, although in the exemplary embodiment, the GA processor executes floating point calculations to achieve precise sensor coordinate variations.

Eventually, after enough generations are produced, the offspring simply do not change much from the parents, even after crossover, mutation and specific crossover. If an acceptable solution has not yet been found, or if one has been found but more searching is desired, a process referred to herein as decay annealing can be implemented. The basic concept of decay annealing is to "jolt" the genetic algorithm process by forcing a significant mutation. This has the effect of trying to avoid the genetic algorithm from settling in at a local minima solution, when there may be an even better solution just a few generations or even a short distance away from the current best solutions.

Figure 13:
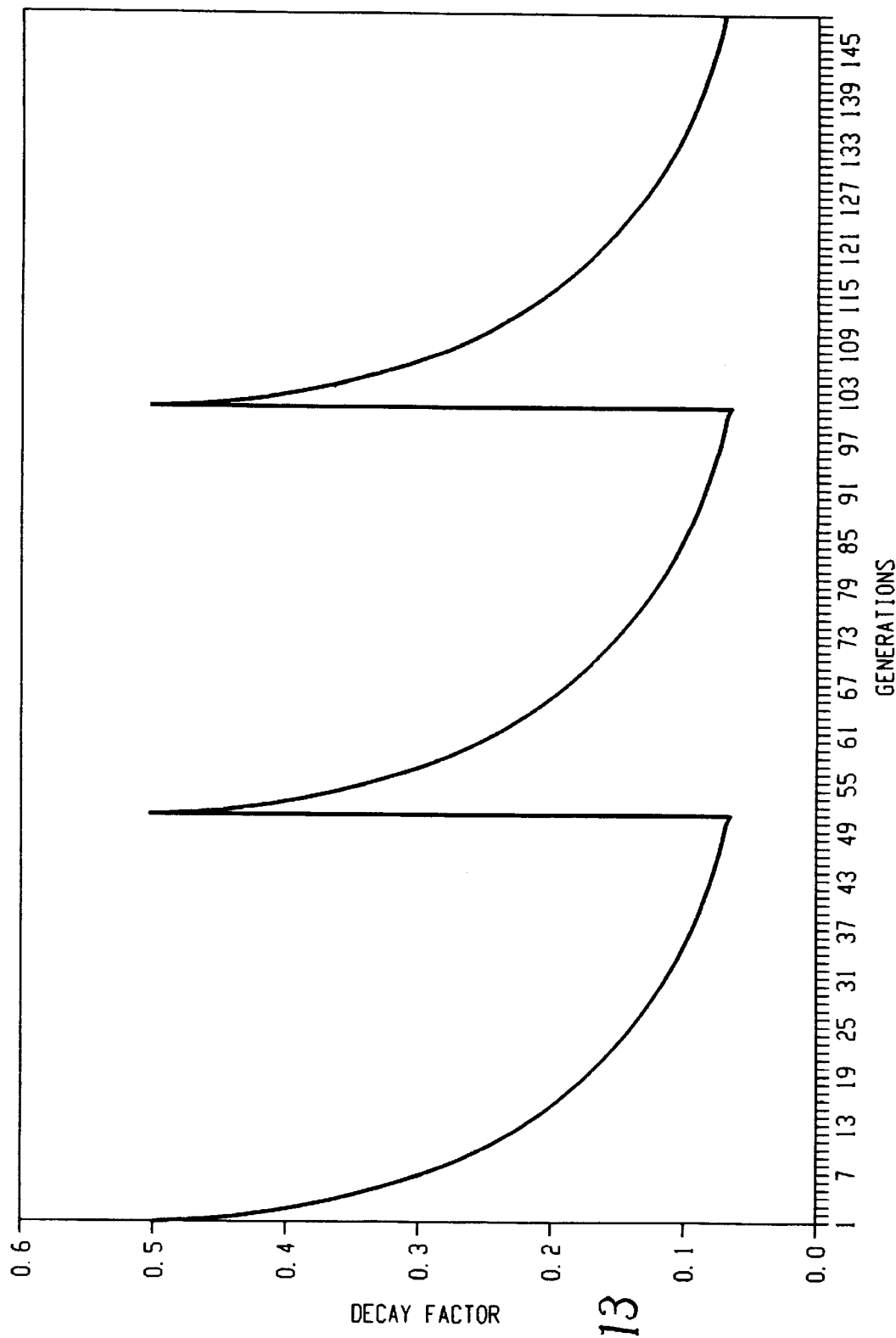
FIG. 13 illustrates an aspect of a decay annealing process.

In the exemplary embodiment, decay annealing is implemented by a significant quantum increase in the decay factor used for the mutation distance calculation described herein above. This is illustrated in a representative manner in FIG. 13. In this example, if after 50 generations there is little change in the individuals from one generation to the next, the decay factor is put back to an initial value, such as 0.5, and the GA 200 continues to then operate on the new generation. The step jump in the decay value causes significant movement in the mutated genes of the offspring and the GA 200 in effect searches through more of the available possible solutions in the reduced domain. The intelligence gained during the preceding fifty generations is not lost, because even after an anneal occurs, the elite individuals survive intact to the next generation.

At some point in time, after enough generations and/or anneals, the genetic algorithm locates an individual whose cost function value meets the performance criteria, and that individual's genetic code, i.e. its chromosome, identifies the optimum positions to place the sensors in or with respect to the tank 10. Again, alternative searches, such as with different numbers or types of sensors can be performed to determine if different sensor configurations and combinations provide better results, or is the same performance can be met with fewer sensors, to name two examples of the types of analysis that the invention provides, far and above the limitations of the previous techniques that were labor intensive and dependent to a large extent on skill, experience and intuition of the design engineer.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. A method for determining an optimized solution of positions for N liquid surface sensors used to gauge quantity of liquid in the container, comprising the steps of:

a) defining geometric limits of the container in terms of coordinates of a three axis (x,y,z) reference coordinate system assigned to the container;

b) defining a chromosome structure for an individual, wherein said chromosome structure identifies a solution in terms of position data of the N sensors;

c) determining a population of individuals wherein each individual in said population is a possible solution within said geometric limits; each individual having a respective chromosome; and d) executing a genetic algorithm on said population to identify a solution that meets a performance criteria as measured by a predetermined cost function.

2. The method of claim 1 wherein said cost function provides a measure of an individual's ability to meet a predetermined performance criteria.

3. The method of claim 1 wherein said cost function provides a measure of an individual's ability to gauge liquid quantity.

4. The method of claim 3 wherein said cost function is a measure of an individual's ability to gauge liquid quantity over a range of pitch and roll attitudes of the container.

5. The method of claim 3 wherein said measure is based on accuracy of volume measurement.

6. The method of claim 1 comprising the step of identifying a valid domain of all possible sensor positions for each of N sensors; said valid domain being defined within said geometric limits and being delimited by one or more restriction requirements.

7. The method of claim 6 wherein one of said restriction requirements identifies coordinates of invalid sensor positions.

8. The method of claim 6 wherein each individual in said population of possible solutions is within said valid domain.

9. The method of claim 1 wherein said population of possible solutions is randomly selected from a reduced domain of possible sensor positions.

10. The method of claim 9 wherein said reduced domain is obtained by: 1) determining a second cost function value for each possible sensor position within said geometric limits, and 2) eliminating sensor positions that are unlikely to be part of an acceptable solution.

11. The method of claim 10 wherein said second cost function provides a measure of a sensor's ability to detect the liquid surface at a specified sensor position for a plurality of pitch and roll attitudes of the container.

12. The method of claim 11 wherein said second cost function comprises a weighted sum of the number ($N_a$) of times a sensor detects the liquid surface at a plurality of pitch and roll attitudes of the container, wherein each value $N_s$ is weighted by an importance factor ($I_a$).

13. The method of claim 12 wherein said importance factor is a number that indicates importance of a container attitude defined by corresponding pitch and roll values.

14. The method of claim 13 wherein each importance factor is a numeral between 0 and 1 inclusive.

15. The method of claim 1 wherein said genetic algorithm includes one or more of the following operations:
   a) mating of individuals to produce a next generation of offspring by crossover between chromosomes of mated individuals;
   b) producing a next generation of offspring by mutation of genes in an individual's chromosome;
   c) mating of individuals to produce offspring by specific crossover of genes between chromosomes of mated individuals;
   d) mating of individuals by tournament selection;
   e) decay annealing after a number of generations produces the same solution;
   f) identifying for each generation a number of elite individuals that survive to the next generation.

16. The method of claim 15 wherein crossover occurs based on a probabilistic determination that is a function of the Euclidean distance between corresponding sensor positions of mated individuals.

17. The method of claim 15 wherein mutation occurs based on a probabilistic determination that is a function of the genetic similarity between a potential offspring and the corresponding mated individuals used to produce said potential offspring.

18. The method of claim 15 wherein decay annealing occurs after a selected number of generations are produced; said annealing being characterized by a mutation that is effected by a gene standard deviation that is a function of a decay factor times a range factor.

19. The method of claim 18 wherein said decay factor varies over time by decreasing with each generation produced.

20. The method of claim 18 wherein said range factor is defined by upper and lower limits of distance that a gene can be mutated.

21. The method of claim 1 wherein said genetic algorithm produces successive generations of individuals; wherein each individual in a generation is verified to be within a domain of valid solutions.

22. The method of claim 21 wherein said cost function is used to assign a value to each individual in each said generation.

23. The method of claim 22 wherein for each said generation a predetermined number of elite individuals are selected to survive to the next generation based on said values determined from said cost function.

24. The method of claim 1 wherein said optimized solution is used with container geometry, liquid surface height and pitch/roll attitude data to train a neural network that executes a height to volume conversion function.

25. The method of claim 1 wherein said cost function assigns a cost function value to each individual based on accuracy of said individual in measuring liquid volume over a plurality of container attitudes.

26. The method of claim 25 wherein each said cost function value is based on a root mean squared error calculation of a set of data obtained by a simulated measurement of volume at a plurality of attitudes for the corresponding individual.

27. The method of claim 25 wherein said cost function value is determined by a neural network.

28. A liquid gauging system for a container, comprising: a set of sensors associated with the container and that produce outputs related to height of fluid in the container; and a control system for determining volume of liquid in the container based on said sensor outputs; said sensors being disposed at positions relative to the container, which positions are determined by execution of a genetic algorithm; said sensor positions satisfying a cost function measure to meet a predetermined performance criteria.

29. A liquid gauging system for a container, comprising: a set of sensors associated with the container and that produce outputs related to height of fluid in the container; and a control system for determining volume of liquid in the container based on said sensor outputs; said control system executing a height to volume function to determine volume of liquid in the container based on said sensor outputs; said sensors being disposed at positions relative to the container, which positions satisfy a predetermined performance criteria as measured by a cost function.

30. The apparatus of claim 29 wherein said positions are determined by executing a genetic algorithm that uses a database derived from a computer-based solid container model.

31. The apparatus of claim 30 wherein said cost function is based on the ability of said sensors to produce outputs that can be used to accurately derive liquid quantity in the container.

32. A liquid gauging system for determining liquid volume in a container, made by the following process:
   a) creating a solid computer model of the container based on geometric limits of the container;
   b) executing a genetic algorithm to find a solution of positions for a number of sensors, which positions satisfy a predetermined performance criteria as measured by a cost function; and
   c) placing said sensors at said positions.

33. Liquid gauging system for liquid in a container, comprising: a plurality of sensors at respective positions in the container; each of said sensors measuring a respective parameter of the liquid in the container and producing a sensor output related to its measured parameter; and a processor that receives said sensor outputs and determines, based on said sensor outputs, a quantity of the liquid in the container; said processor determining said quantity based on sensor positions selected by execution of a genetic algorithm.

34. The apparatus of claim 33 wherein said processor executes a height to volume conversion algorithm that is based on sensor positions determined by said genetic algorithm.

35. The apparatus of claim 34 wherein said height to volume algorithm comprises a neural net trained with a data set that is based on said sensor positions.

* * * * *